US012754708B2

(12) United States Patent
Shin et al.

(10) Patent No.: US 12,754,708 B2
(45) Date of Patent: Oct. 6, 2026

(54) DISPLAY DEVICE, MODULAR DISPLAY DEVICE, AND CONTROL METHOD THEREFOR

(71) Applicant: SAMSUNG ELECTRONICS CO., LTD., Suwon-si (KR)

(72) Inventors: Kiock Shin, Suwon-si (KR); Jaemoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/734,461

(22) Filed: Jun. 5, 2024

(65) Prior Publication Data

US 2024/0319948 A1 Sep. 26, 2024

Related U.S. Application Data

(63) Continuation of application No. PCT/KR2023/000529, filed on Jan. 11, 2023.

(30) Foreign Application Priority Data

Jan. 12, 2022 (KR) ........................ 10-2022-0004535

(51) Int. Cl.
*G06F 3/14* (2006.01)
*G09F 9/302* (2006.01)

(52) U.S. Cl.
CPC .............. *G06F 3/1446* (2013.01); *G06F 3/14* (2013.01); *G09F 9/302* (2013.01); *G09F 9/3026* (2013.01); *G09G 2300/026* (2013.01)

(58) Field of Classification Search
CPC .......... G06F 3/1446; G06F 3/14; G09F 9/302; G09F 9/3026; G09G 2300/026
See application file for complete search history.

(56) References Cited

U.S. PATENT DOCUMENTS 5,523,769 A * 6/1996 Lauer .................... G06F 3/1446 345/1.3
8,890,770 B2 * 11/2014 Koebrich ................ G09G 5/00 345/1.3

(Continued)

FOREIGN PATENT DOCUMENTS

EP 3 896 984 A1 9/2020
JP 2003-150119 A 5/2003

(Continued)

OTHER PUBLICATIONS

International Search Report (PCT/ISA/210) dated Apr. 24, 2023, issued by the International Searching Authority in International Application No. PCT/KR2023/000529.

(Continued)

*Primary Examiner* — Michael J Jansen, II
(74) *Attorney, Agent, or Firm* — Sughrue Mion, PLLC

(57) ABSTRACT

A display device included in a modular display device including a plurality of display devices, the display device including: a plurality of communication interfaces; and at least one processor configured to: identify, based on a first signal transmitted by a main control box being received through a first communication interface from among the plurality of communication interfaces, the first communication interface as having received the first signal along a main connection path, control remaining communication interfaces among the plurality of communication interfaces to output the first signal, and identify, based on a second signal transmitted by a sub control box being received through a second communication interface among the plurality of communication interfaces, the second communication interface as having received the second signal along a sub connection path.

19 Claims, 8 Drawing Sheets

(56) References Cited

U.S. PATENT DOCUMENTS

| | | | | |
|---|---|---|---|---|
| 9,134,950 | B2 * | 9/2015 | Choi | G06F 3/1446 |
| 9,239,698 | B2 * | 1/2016 | Wang | G06F 3/1446 |
| 9,354,840 | B2 * | 5/2016 | Seo | G06F 3/1446 |
| 9,696,959 | B2 * | 7/2017 | Fu | G09G 5/003 |
| 11,119,720 | B2 * | 9/2021 | Kim | G06F 3/1446 |
| 11,269,578 | B2 * | 3/2022 | Kim | G06F 1/1601 |
| 11,276,366 | B2 * | 3/2022 | Kim | G09G 5/006 |
| 11,327,855 | B2 * | 5/2022 | Kim | H04L 43/10 |
| 11,422,766 | B2 * | 8/2022 | Ahn | G09G 5/006 |
| 11,861,256 | B2 * | 1/2024 | Ahn | H04N 21/4122 |
| 11,972,168 | B2 * | 4/2024 | Yi | G06F 3/14 |
| 12,154,490 | B2 * | 11/2024 | Seo | G06F 3/1446 |
| 2006/0164326 | A1 * | 7/2006 | Date | G06F 3/1446<br>345/1.3 |
| 2009/0243962 | A1 * | 10/2009 | Hioki | G06F 3/1446<br>345/1.3 |
| 2011/0122048 | A1 * | 5/2011 | Choi | G09G 5/003<br>345/1.1 |
| 2012/0319926 | A1 * | 12/2012 | Koebrich | G09G 5/00<br>345/1.3 |
| 2013/0293443 | A1 * | 11/2013 | Seo | G06F 3/1446<br>345/1.2 |
| 2014/0184658 | A1 * | 7/2014 | Wang | G06F 3/1446<br>345/690 |
| 2015/0268918 | A1 * | 9/2015 | Fu | G06F 3/1446<br>345/661 |
| 2020/0004492 | A1 * | 1/2020 | Kim | G06F 3/1446 |
| 2020/0264828 | A1 * | 8/2020 | Kim | G06F 3/1454 |
| 2021/0011820 | A1 * | 1/2021 | Kim | G06F 3/1446 |
| 2021/0326092 | A1 * | 10/2021 | Ahn | H04N 21/43072 |
| 2021/0375231 | A1 * | 12/2021 | Kim | G06F 3/1446 |
| 2022/0342626 | A1 * | 10/2022 | Ahn | H04N 21/43072 |
| 2023/0133968 | A1 * | 5/2023 | Yi | G06F 3/1446<br>345/1.3 |
| 2023/0267878 | A1 * | 8/2023 | Seo | G06F 3/1446<br>345/204 |
| 2024/0319948 | A1 * | 9/2024 | Shin | G09F 9/3026 |

FOREIGN PATENT DOCUMENTS

| | | | |
|---|---|---|---|
| JP | 2007-298754 | A | 11/2007 |
| JP | 2011-257540 | A | 12/2011 |
| JP | 2016-191771 | A | 11/2016 |
| KR | 10-2010-0041607 | A | 4/2010 |
| KR | 10-2011-0058049 | A | 6/2011 |
| KR | 10-2013-0070437 | A | 6/2013 |
| KR | 10-1548351 | B1 | 8/2015 |
| KR | 10-2016-0149991 | A | 12/2016 |
| KR | 10-2019-0048424 | A | 5/2019 |
| KR | 10-2021-0007579 | A | 1/2021 |
| KR | 10-2021-0128828 | A | 10/2021 |
| KR | 10-2564110 | B1 | 8/2023 |

OTHER PUBLICATIONS

Written Opinion (PCT/ISA/237) dated Apr. 24, 2023, issued by the International Searching Authority in International Application No. PCT/KR2023/000529.

Communication dated Jan. 13, 2025, issued by the European Patent Office in European Patent Application No. 23740458.7.

Communication dated Jan. 12, 2026 issued by the Korean Ministry of Intellectual Property in Korean Patent Application No. 10-2022-0004535.

* cited by examiner

DISPLAY DEVICE, MODULAR DISPLAY DEVICE, AND CONTROL METHOD THEREFOR

CROSS REFERENCE TO RELATED APPLICATION(S)

This application is a continuation of International Application No. PCT/KR2023/000529, filed on Jan. 11, 2023, in the Korean Intellectual Property Receiving Office, which is based on and claims priority to Korean Patent Application No. 10-2022-0004535, filed on Jan. 12, 2022, in the Korean Intellectual Property Office, the disclosures of which are incorporated by reference herein in their entireties.

BACKGROUND

1. Field

The disclosure relates to a display device, a modular display device, and a control method therefor, and more particularly to a display device which includes a plurality of communication interfaces, a modular display device, and a control method therefor.

2. Description of Related Art

Recently, display systems of various forms are being developed and distributed.

Specifically, a number of display modules or display devices which constitute a display system is increasing proportionally according to display systems becoming large-scaled and high-resolutioned.

In the case of modular display devices, a size or form of a modular display device may be changed variously according to a number of display devices, a size of the display devices, and the like which constitute the modular display device.

With respect to a plurality of display devices connected in a Daisy Chain method, when connection is severed, or an error in signal transmission occurs, the modular display device may be configured to receive a signal from each of the devices that provide a main signal and devices that provide a sub signal to prevent a problem of the plurality of display devices which are consecutively connected from not being able to receive a signal.

If signals respectively output by the device that provides the main signal and the device that provides the sub signal are different, there may be a problem of the plurality of display devices constituting the modular display device outputting different images from one another or outputting an image which does not appear to be unified.

There has been a demand for a method of operating the modular display device prioritizing the signal output by the device that provides the main signal.

SUMMARY

Provided are a display device that identifies a main connection path when a plurality of display devices included in a modular display device is respectively connected according to a Daisy Chain method, a modular display device, and a control method therefor.

Additional aspects will be set forth in part in the description which follows and, in part, will be apparent from the description, or may be learned by practice of the presented embodiments.

According to an aspect of the disclosure, a display device of a modular display device including a plurality of display devices, the display device may include: a plurality of communication interfaces; and at least one processor configured to: identify, based on a first signal transmitted by a main control box being received through a first communication interface from among the plurality of communication interfaces, the first communication interface as having received the first signal along a main connection path, control remaining communication interfaces among the plurality of communication interfaces, other the first communication interface, to output the first signal, and identify, based on a second signal transmitted by a sub control box being received through a second communication interface among the plurality of communication interfaces, the second communication interface as having received the second signal along a sub connection path, where the main connection path is for sequentially transmitting the first signal transmitted by the main control box to the plurality of display devices, respectively, and where the sub connection path is for sequentially transmitting the second signal transmitted by the sub control box to the respective display devices in a reverse order than the main connection path.

The at least one processor may be further configured to: identify, based on a feedback signal indicating a receipt of the first signal through the second communication interface after the remaining communication interfaces output the first signal, the second communication interface as having transmitted the first signal along the main connection path.

The at least one processor may be further configured to: identify, based on a plurality of signals being received through the plurality of communication interfaces, the first signal received through the first communication interface, and control the display device based on the first signal received through the first communication interface and ignore the remaining signals.

The at least one processor may be further configured to: control, based on no signal being received through the first communication interface among the plurality of signals, the display device based on the second signal received through the second communication interface.

The display devices may be provided in a matrix form, the plurality of communication interfaces may be respectively provided at four directions based on a front surface of the display device, the first communication interface may be provided at a first direction among the four directions, and may be configured to receive the first signal from a first display device adjacent to the display device and transmit the second signal to the first display device, the second communication interface may be provided at a second direction among the four directions, and may be configured to receive the second signal from a second display device adjacent to the display device and transmit the first signal to the second display device, and the four directions include an upper side, a lower side, a left side, and a right side based on the front surface of the display device.

The first signal may be output by the main control box and sequentially transmitted to the display devices along the main connection path, and the second signal may be output by the sub control box and sequentially transmitted to the display devices along the sub connection path.

The first signal transmitted by the main control box may include identification information for identifying the main connection path.

The display device may further include: a memory stored with priority order information for the respective communication interfaces, where the at least one processor is further configured to: control, based on a plurality of signals being received through the plurality of communication interfaces, the display device based on a signal received through a predetermined communication interface according to the priority order information, and update, based on the first signal transmitted by the main control box being received through the first communication interface, a priority order corresponding to the first communication interface in the priority order information.

According to an aspect of the disclosure, a control method of a display device of a modular display device including a plurality of display devices, the method may include: identifying, based on a first signal transmitted by a main control box being received through a first communication interface among a plurality of communication interfaces provided in the display device, the first communication interface as having received the first signal along a main connection path; controlling remaining communication interfaces among the plurality of communication interfaces, other the first communication interface, to output the first signal; and identifying, based on a second signal transmitted by a sub control box being received through a second communication interface among the plurality of communication interfaces, the second communication interface as having received the second signal along a sub connection path, where the main connection path is for sequentially transmitting the first signal transmitted by the main control box to the display devices, and the sub connection path is for sequentially transmitting the second signal transmitted by the sub control box to the display devices in a reverse order than the main connection path.

The method may further include: identifying, based on a feedback signal indicating a receipt of the first signal through the second communication interface after the remaining communication interfaces output the first signal, the second communication interface as having transmitted the first signal along the main connection path.

The method may further include: identifying, based on a plurality of signals being received through the plurality of communication interfaces, the first signal received through the first communication interface; and controlling the display device based on the first signal received through the first communication interface and ignoring the remaining signals.

The method may further include: controlling, based on no signal being received through the first communication interface among the plurality of signals, the display device based on the second signal received through the second communication interface.

The display devices may be provided in matrix form, the plurality of communication interfaces may be respectively provided at four directions based on a front surface of the display device, the first communication interface may be provided at a first direction among the four directions, the second communication interface may be provided at a second direction among the four directions, and the four directions may include an upper side, a lower side, a left side, and a right side based on the front surface of the display device, and the method may include: receiving the first signal from a first display device adjacent to the display device through the first communication interface or transmitting the second signal to the first display device; and receiving the second signal from a second display device adjacent to the display device through the second communication interface or transmitting the first signal to the second display device.

The first signal may be output by the main control box and sequentially transmitted to the display devices along the main connection path, and the second signal may be output by the sub control box and sequentially transmitted to the display devices along the sub connection path.

The first signal transmitted by the main control box may include identification information for identifying the main connection path.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
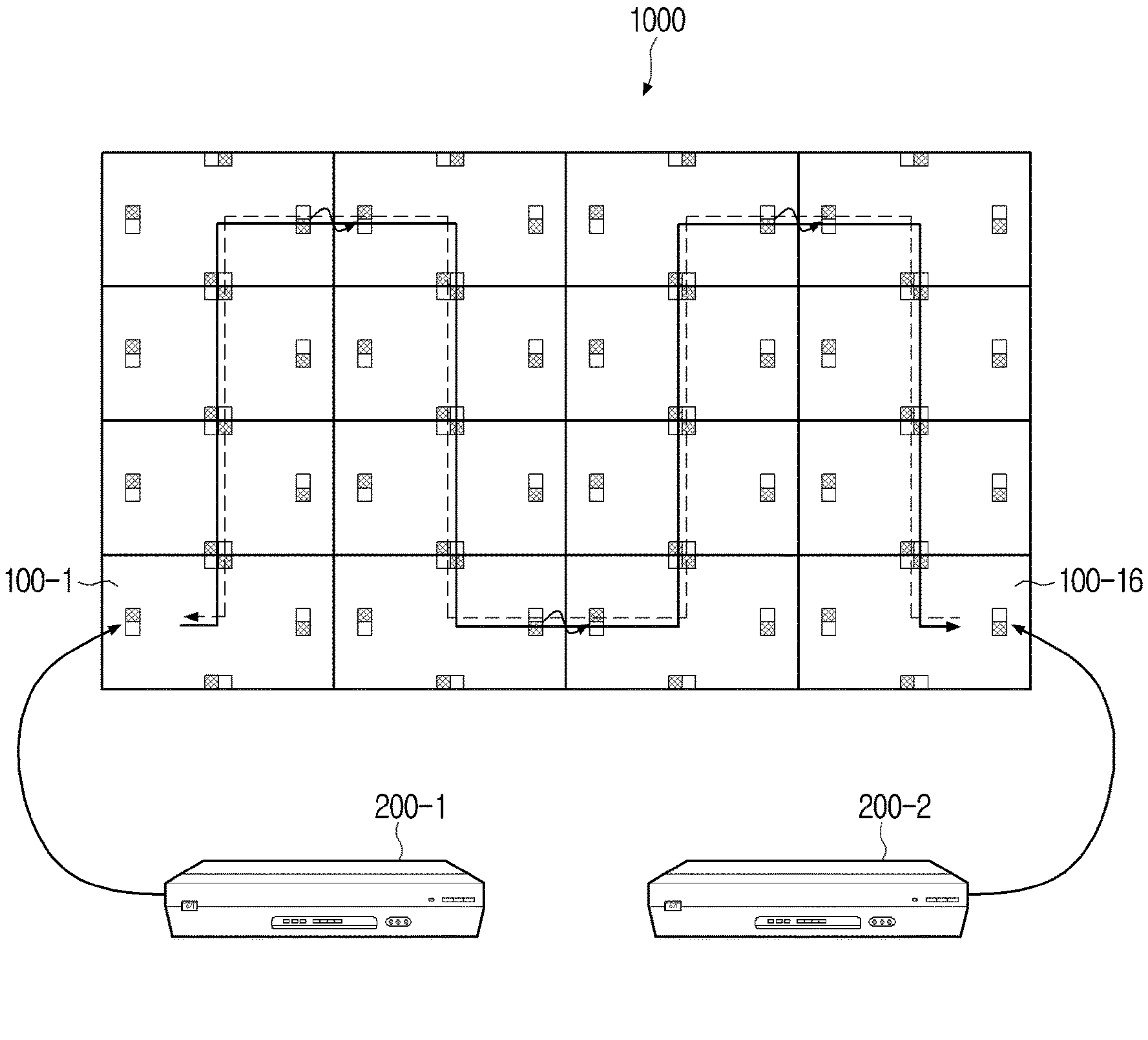
FIG. 1 is a diagram illustrating a connection method between a plurality of display devices according to an embodiment of the disclosure.

Terms used in the disclosure will be briefly described, and the disclosure will be described in detail.

Various modifications may be made to the embodiments of the disclosure, and there may be various types of embodiments. Accordingly, exemplary embodiments will be illustrated in drawings, and described in detail in the detailed description. However, it should be noted that the embodiments are not for limiting the scope of the disclosure to a specific embodiment, but they should be interpreted to include all modifications, equivalents or alternatives of the embodiments included in the ideas and the technical scopes disclosed herein. In case it is determined that in describing the embodiments, detailed description of related known technologies may unnecessarily confuse the gist of the disclosure, the detailed description will be omitted.

Terms such as "first," and "second" may be used in describing the various elements, but the elements are not to be limited by the terms. The terms may be used only to distinguish one element from another.

A singular expression includes a plural expression, unless otherwise specified. It is to be understood that the terms such as "form," "include," "have," or "comprise" are used herein to designate a presence of a characteristic, number, step, operation, element, component, or a combination thereof, and not to preclude a presence or a possibility of adding one or more of other characteristics, numbers, steps, operations, elements, components or a combination thereof.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

The term "module" or "part" used herein perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor (not shown).

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. The terms including technical or scientific terms used in the disclosure may have the same meanings as generally understood by those skilled in the art.

FIG. 1 is a diagram illustrating a connection method between a plurality of display devices according to an embodiment of the disclosure.

Referring to FIG. 1, a modular display device 1000 may be configured with a plurality of display devices 100-1, . . . , **100-*n*. The modular display device 1000 may display video signals using the plurality of display devices 100-1, . . . , 100-*n*. The modular display device 1000 may be implemented as a television (TV), but is not limited thereto, and may be applicable without limitation so long as it is a device which has a display function such as, for example, and without limitation, a video wall, a large format display (LFD), a digital signage, a digital information display (DID), a projector display, and the like. In addition, the modular display device 1000** may be implemented as a display of various forms such as, for example, and without limitation, a liquid crystal display (LCD), an organic light-emitting diode (OLED), a Liquid Crystal on Silicon (LCoS), a Digital Light Processing (DLP), a quantum dot (QD) display panel, quantum dot light-emitting diodes (QLED), and the like.

The modular display device 1000 according to an embodiment may be implemented in a form including the plurality of display devices (or, modules) 100-1, . . . , **100-*n*. For example, as shown in FIG. 1, the plurality of display devices 100-1, . . . , 100-*n* may be coupled to implement one display device (i.e., a display system 1000). The plurality of display devices 100-1, . . . , 100-*n*** according to an embodiment of the disclosure may respectively include a plurality of self-emissive devices. Here, a self-emissive device may be at least one from among a light emitting diode (LED) or a micro LED.

In addition, the respective display devices 100-1, . . . , **100-*n*** may be implemented as a LED cabinet which includes a plurality of light emitting diode (LED) devices. Here, a LED device may be implemented into a RGB LED, and the RGB LED may include a red LED, a green LED, and a blue LED. In addition, the LED device may additionally include a white LED in addition to the RGB LED.

According to an embodiment, the LED device may be implemented as a micro LED. Here, the micro LED may be an LED of about 5 to 100 micrometer size, and may be an ultra-small light emitting device which emits light on its own without a color filter.

The respective display devices 100-1, . . . , **100-*n* constituting the modular display device 1000** according to an embodiment may be connected to external devices (e.g., a control device, a source device, etc.), and receive a control signal, a video signal, a sound signal, and the like from the external device.

The respective display devices 100-1, . . . , **100-*n* provided in the modular display device 1000 may be connected to one another. For example, at least one display device that received a control signal, a video signal, a sound signal, and the like from source devices, external control devices, and the like may transmit the received control signal, video signal, sound signal, and the like to another display device which is connected in series with itself and thereby, the control signal, the video signal, the sound signal, and the like may be sequentially transmitted to all of the plurality of display devices 100-1, . . . , 100-*n***.

According to an embodiment, as a resolution, size, and the like of the modular display device 1000 increases, a number of the plurality of display devices 100-1, . . . , **100-*n* provided in the modular display device 1000 increases proportionately, and a communication connection relationship (e.g., a connection method for the respective display devices 100-1, . . . , 100-*n* to receive the control signal, the video signal, the sound signal, and the like from external devices) and the like between the plurality of display devices 100-1, . . . , 100-*n*** may be variously changed in addition to a standardized communication connection relationship in the related art.

The plurality of display devices 100-1, . . . , **100-*n* according to an embodiment may be connected according to a Daisy Chain method. For example, a first display device 100-1 may be connected with a second display device 100-2, the second display device 100-2 may be connected with a third display device 100-3, and an n−1 display device 100-*n*−1 may be connected with an nth display device 100-*n*. That is, the plurality of display devices 100-1, . . . 100-*n*** may be consecutively connected.

Referring to FIG. 1, for convenience in description, the modular display device 1000 may include a total of sixteen display devices 100-1, . . . , 100-16, and has been shown assuming that first to sixteenth display devices 100-1, . . . , 100-16 have been disposed in a 4×4 matrix form, but this is one embodiment and is not limited thereto. For example, the number of the plurality of display devices 100-1, . . . , **100-*n* constituting the modular display device 1000 may be variously changed according to the size, resolution, and the like of the modular display device 1000, and a form in which the plurality of display devices 100-1, . . . , 100-*n* are disposed may also be variously changed. The modular display device 1000 configured with a total of sixteen display devices 100-1, . . . , 100-16** which are disposed in a 4×4 matrix form will be assumed and described below for convenience of description.

Referring to FIG. 1, the very first display device (e.g., the first display device 100-1) from among the first to sixteenth display devices 100-1, . . . , 100-16 connected according to the Daisy Chain method may be connected with an external device (e.g., a main control box), and the very last display device (e.g., a sixteenth display device 100-16) may be connected with an external device (e.g., a sub control box).

According to an embodiment, because the first to sixteenth display devices 100-1, . . . , 100-16 are connected according to the Daisy Chain method, a signal transmitted by a main control box 200-1 to the first display device 100-1 may be sequentially transmitted to the first display device 100-1 to the sixteenth display device 100-16.

A connection path for sequentially transmitting a signal output by the main control box 200-1 to the respective display devices 100-1, . . . , 100-*n* may be referred to as a main connection path for convenience of description below, and in FIG. 1, a solid line arrow is shown connecting from the first display device 100-1 to the sixteenth display device 100-16.

Because the Daisy Chain method consecutively connects the plurality of display devices 100-1, . . . , 100-*n*, if connection is severed in any one section (e.g., between a fourth display device 100-4 and a fifth display device 100-5), or if a failure in signal transmission occurs for various reasons such as an error, there may be a problem regarding the plurality of display devices (e.g., the fifth display device 100-5 to the nth display device 100-*n*) connected thereafter not being able to receive a signal.

To prevent the occurrence of the problem described above, the plurality of display devices 100-1, . . . , 100-*n* may sequentially receive the signal transmitted by the external device through a sub connection path in addition to the main connection path.

Referring to FIG. 1, a signal transmitted by a sub control box 200-2 to the sixteenth display device 100-16 may be sequentially transmitted from the sixteenth display device 100-16 to the first display device 100-1.

A connection path for sequentially transmitting a signal output by the sub control box 200-2 to the respective display devices 100-1, . . . , 100-*n* may be referred to as a sub connection path for convenience of description below, and in FIG. 1, a dotted line arrow is shown connecting from the sixteenth display device 100-16 to the first display device 100-1.

According to an embodiment, if an image signal output by the main control box 200-1 and an image signal output by the sub control box 200-2 are the same, the plurality of display devices 100-1, . . . , 100-*n* may receive the image signal output by the sub control box 200-2 through the sub connection path even if connection is severed in some sections on the main connection path.

For example, even if connection is severed in any one section (e.g., between the fourth display device 100-4 and the fifth display device 100-5) on the main connection path, or a failure in signal transmission occurs by various reasons such as an error, the plurality of display devices (e.g., the fifth display device 100-5 to the nth display device 100-*n*) connected thereafter may receive the signal output by the sub control box 200-2 through the sub connection path. Accordingly, because the respective display devices 100-1, . . . , 100-*n* receive at least one from among the signal output by the main control box 200-1 or the signal output by the sub control box 200-2, the modular display device 1000 configured with the plurality of display devices 100-1, . . . , 100-*n* may output an image corresponding to the signal without error.

However, if the respective display devices 100-1, . . . , 100-*n* receive a plurality of signals according to an embodiment, the respective display devices 100-1, . . . , 100-*n* may have to classify (or identify) the signal output by the main control box 200-1 or the signal output by the sub control box 200-2 from among the plurality of signals, and there may be need to perform an operation prioritizing the signal output by the main control box 200-1. Detailed descriptions thereof will be described below.

Figure 2:
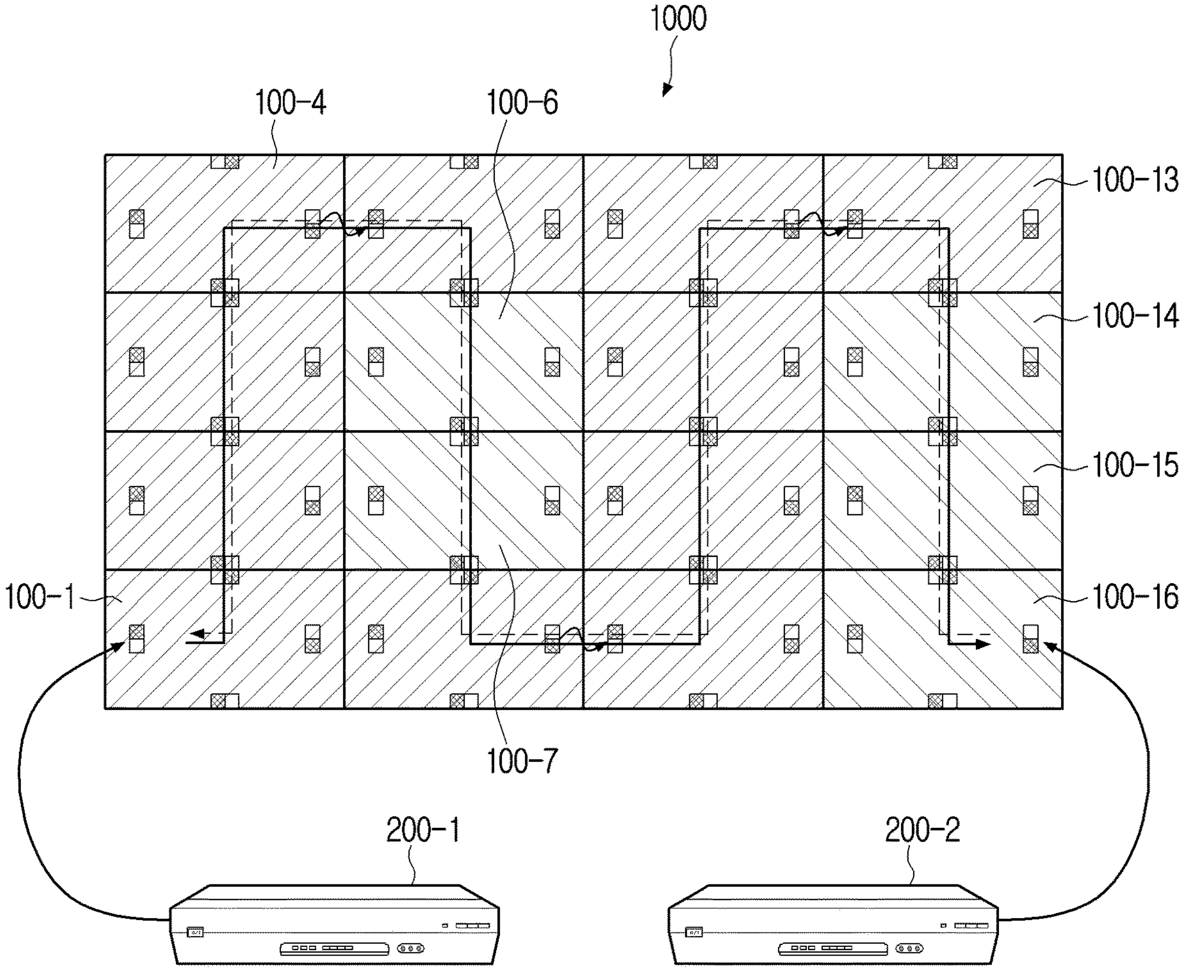
FIG. 2 is a diagram illustrating an example of a plurality of display devices connected in a Daisy Chain according to the related art.

FIG. 2 is a diagram illustrating an example of a plurality of display devices connected in a Daisy Chain according to the related art.

Referring to FIG. 2, the first to sixteenth display devices 100-1, . . . , 100-16 may respectively receive the signal output by the main control box 200-1 through the main connection path, and receive the signal output by the sub control box 200-2 through the sub connection path simultaneously. If the main control box 200-1 and the sub control box 200-2 output the same signal (e.g., same image signal), the first to sixteenth display devices 100-1, . . . , 100-16 may respectively receive the same plurality of signals.

If the main control box 200-1 and the sub control box 200-2 output different signals, there may be a problem of some display devices performing an operation based on the signal output by the main control box 200-1 and remaining display devices performing an operation based on the signal output by the sub control box 200-2 despite the first to sixteenth display devices 100-1, . . . , 100-16 having to respectively perform an operation based on the signal output by the main control box 200-1 and the first to sixteenth display devices 100-1, . . . , 100-16 not being able to respectively identify whether which signal from among the plurality of signals is the signal output by the main control box 200-1.

For example, referring to FIG. 2, a display device 100 may be provided with a plurality of communication interfaces. According to an embodiment, a first communication interface from among the plurality of communication interfaces may receive the signal transmitted by the main control box 200-1 from the main control box 200-1 or another display device adjacently positioned along the main connection path.

In addition, a second communication interface from among the plurality of communication interfaces may receive the signal transmitted by the sub control box 200-2 from the sub control box 200-2 or another display device adjacently positioned along the sub connection path.

Because the display device 100 according to an embodiment is not able to differentiate the main connection path and the sub connection path between the plurality of display devices 100-1, . . . , 100-*n* constituting the modular display device 1000, the display device 100 may not be able to classify the signal output by the main control box 200-1 and the signal output by the sub control box 200-2 from among signals received through the first communication interface and signals received through the second communication interface.

Accordingly, the display device 100 may perform an operation prioritizing a signal received from a specific communication interface from among the plurality of communication interfaces.

For example, the display device 100 may include a total of four communication interfaces positioned at each of four directions based on the front surface, and a priority order has been set for the respective four communication interfaces. In an example, the display device 100 may set a first priority order to the first communication interface positioned at a left side of the front surface thereof, set a second priority order to the second communication interface positioned at a lower side thereof, set a third priority order to a third communication interface positioned at a right side thereof, and set a fourth priority order to a fourth communication interface positioned at an upper side thereof. Here, the priority order is an example for convenience of description, and is not limited hereto. For example, the priority order may be changed according to a manufacturer, a user, and the like.

Accordingly, a sixth display device 100-6 may perform, based on both the signal output by the main control box 200-1 and the signal output by the sub control box 200-2 being received, an operation using the signal output by the sub control box 200-2 (signal received from the second communication interface positioned at the lower side thereof) from among the signal output by the main control box 200-1 (signal received from the fourth communication interface positioned at the upper side thereof) and the signal output by the sub control box 200-2 (signal received from the second communication interface positioned at the lower side thereof) according to a set priority order.

Referring to FIG. 2, the first to fifth display devices 100-1, . . . , 100-5, and eighth to thirteenth display devices 100-8, . . . , 100-13 according to the set priority order may perform an operation using the signal output by the main control box 200-1, and sixth, seventh, and fourteenth to sixteenth display devices 100-6, 100-7, 100-14, . . . , 100-16 may perform an operation using the signal output by the sub control box 200-2.

If the signal output by the main control box 200-1 and the signal output by the sub control box 200-2 are the same (e.g., both signals are a same image signal), because the first to sixteenth display devices 100-1, . . . , 100-16 perform an operation using the same signal, there may be no problem due to the first to sixteenth display devices 100-1, . . . , 100-16 constituting the modular display device 1000 operating in unified manner.

However, if the signal output by the main control box 200-1 and the signal output by the sub control box 200-2 are different, because the first to fifth display devices 100-1, . . . , 100-5 and the eighth to thirteenth display devices 100-8, . . . , 100-13 which perform an operation using the signal output by the main control box 200-1 and the sixth, seventh, and fourteenth to sixteenth display devices 100-6, 100-7, 100-14, . . . , 100-16 which perform an operation using the signal output by the sub control box 200-2 operate differently, there may be a problem of the first to sixteenth display devices 100-1, . . . , 100-16 constituting the modular display device 1000 not operating in the unified manner. Descriptions thereof will be provided with reference to FIG. 3.

Figure 3:
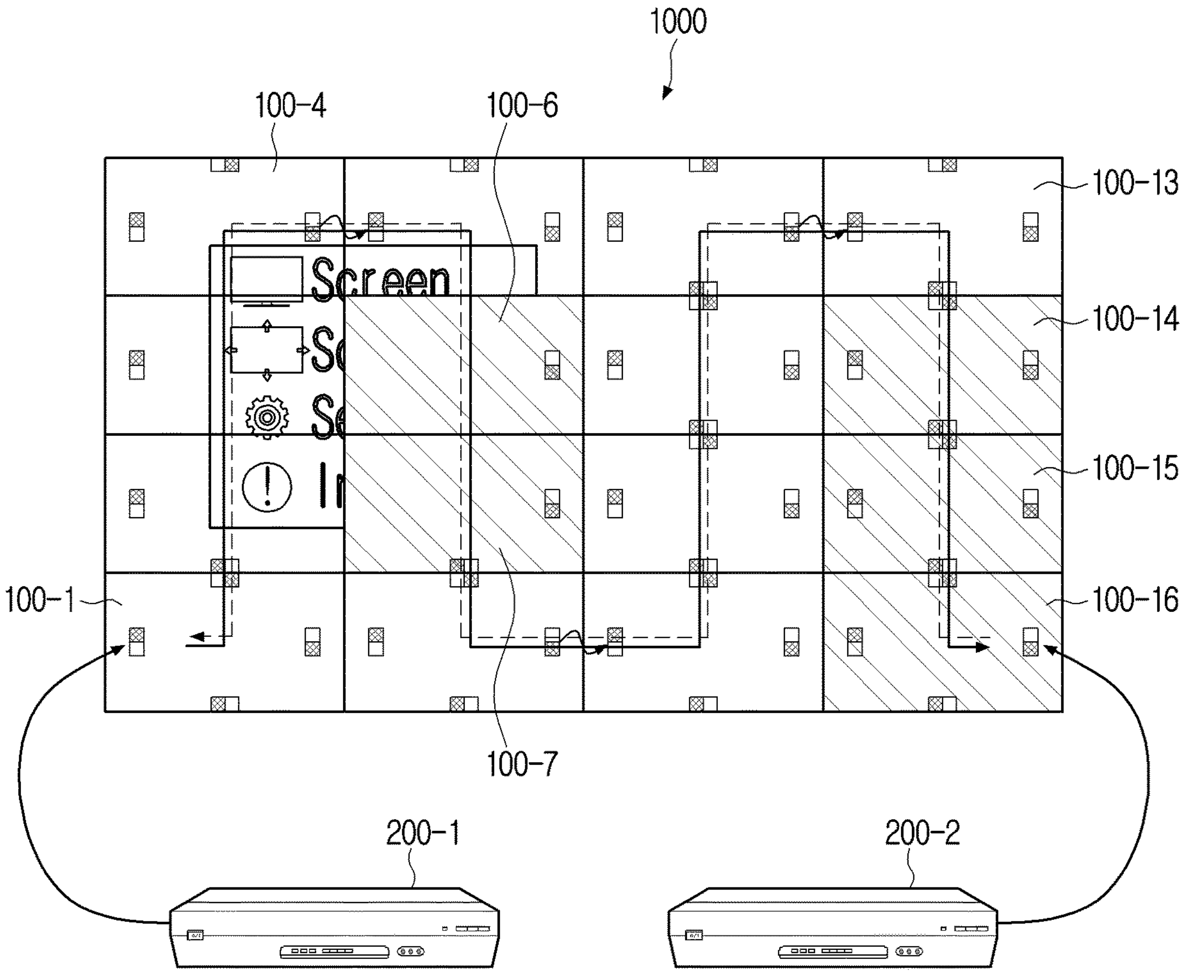
FIG. 3 is a diagram illustrating an example of some display devices from among a plurality of display devices according to the related art receiving different signals.

FIG. 3 is a diagram illustrating an example of some display devices from among a plurality of display devices according to the related art receiving different signals.

The main control box 200-1 and the sub control box 200-2 according to an embodiment of the disclosure may be same in that both provide an image signal to the modular display device 1000, but may be different in that changing in a setting value of the modular display device 1000, and providing a main control signal associated with an operation of the modular display device 1000 are performed by the main control box 200-1 and not performed by the sub control box 200-2. However, the above is one example for convenience of description, and the embodiment is not limited thereto. The sub control box 200-2 may also change the setting value of the modular display device 1000 as same as the main control box 200-1, or provide the main control signal associated with an operation of the main control box 200-1.

The signal output by the main control box 200-1 according to an embodiment may be an image signal or an on screen display (OSD) menu display signal for adjusting the setting value of the modular display device 1000 constituted with the plurality of display devices 100-1, . . . , **100-*n*. The signal output by the sub control box 200-2** may be the image signal.

In this case, the first to fifth display devices 100-1, . . . , 100-5 and the eighth to thirteenth display devices 100-8, . . . , 100-13 which perform an operation using the signal output by the main control box 200-1 according to the priority order set in FIG. 2 may display an image and an OSD menu.

However, as shown in FIG. 3, the sixth, seventh, and fourteenth to sixteenth display devices 100-6, 100-7, 100-14, . . . , 100-16 which perform an operation using the signal output by the sub control box 200-2 may display an image, and may not display the OSD menu.

Accordingly, there is a need for the sixth, seventh, and fourteenth to sixteenth display devices 100-6, 100-7, 100-14, . . . , 100-16 to perform an operation using the signal transmitted by the main control box 200-1 along the main connection path, rather than a signal received by a specific communication interface according to the set priority order.

Figure 4:
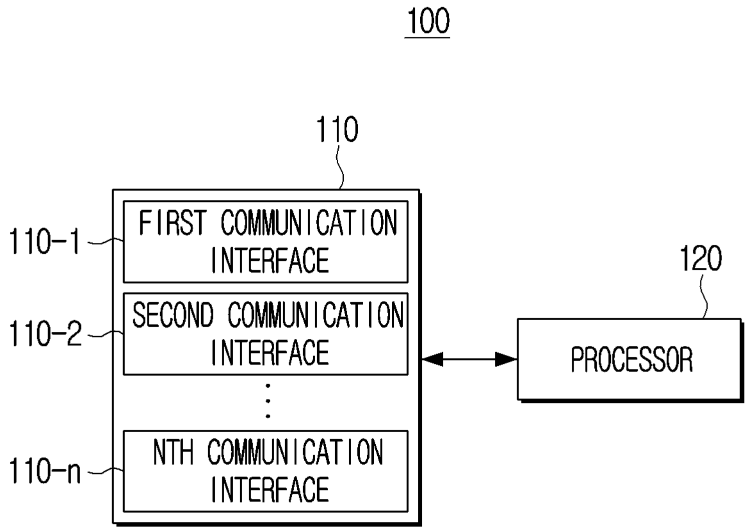
FIG. 4 is a block diagram illustrating a configuration of a display device according to an embodiment of the disclosure.

FIG. 4 is a block diagram illustrating a configuration of a display device according to an embodiment of the disclosure.

Referring to FIG. 4, the display device 100 may include a plurality of communication interfaces 110 and a processor 120.

The display device 100 according to an embodiment of the disclosure may be one from among the plurality of display devices 100-1, . . . , **100-*n* constituting the modular display device 1000 (i.e., a display system), may be implemented as an independent display device 100** on its own, and include a plurality of display modules.

For convenience of description below, the modular display device 1000 has been described as including the plurality of display devices 100-1, . . . , **100-*n*, and the respective display devices 100-1, . . . , 100-*n* have been described as including first to nth communication interfaces 110-1, . . . , 110-*n* and the processor 120**.

Each of the first to nth communication interfaces 110-1, . . . , **110-*n* according to an embodiment may perform communication with external devices (e.g., the main control box 200-1, the sub control box 200-2, a step top box, etc.), and an adjacent another display device 100'**.

The respective communication interfaces 110 may receive input of various signals and data. For example, the respective communication interfaces 110 may perform communication with at least one external device (e.g., the main control box 200-1, the sub control box 200-2, the step top box, etc.) provided within a home through various wired or wireless communication methods that use radio frequency (RF), infrared (IR), and the like such as, for example, and without limitation, an AP-based Wi-Fi (Wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, a near field communication (NFC), or the like, and also perform communication with another display device 100' adjacent to the display device 100 from among the plurality of display devices 100-1, . . . , **100-*n***.

For example, the respective communication interfaces 110 may be implemented with a wired communication interface such as, for example, and without limitation, a V-by-One, a high-definition multimedia interface (HDMI) cable, a low voltage differential signals (LVDS) cable, a digital visual interface (DVI) cable, a D-subminiature (D-SUB) cable, a video graphics array (VGA) cable, an optical cable, and the like.

For example, as shown in FIG. 1, the first display device 100-1 may perform communication with the main control box 200-1 through a first communication interface 110-1, and receive a control signal for controlling the modular display device 1000, an image signal, and the like from the main control box 200-1.

In addition, as shown in FIG. 1, the sixteenth display device 100-16 may perform communication with the sub control box 200-2 through a third communication interface 110-3, and receive an image signal, and the like from the sub control box 200-2.

As described above, each of the main control box 200-1 and the sub control box 200-2 may operate as a source device providing an image signal to the modular display device 1000, and each of the main control box 200-1 and the sub control box 200-2 may perform communication with a separate source device providing an image signal received from the source device to the modular display device 1000.

In addition, each of the main control box 200-1 and the sub control box 200-2 may be connected with an outlet positioned at a wall via wire, and provide driving power to the modular display device 1000.

The processor 120 may be electrically connected with a memory, and control the overall operation of the display device 100.

According to an embodiment of the disclosure, the processor 120 may be implemented as a digital signal processor (DSP) for processing a digital image signal, a microprocessor, or a time controller (TCON). However, the embodiment is not limited thereto, and may include one or more from among a central processing unit (CPU), a micro controller unit (MCU), a micro processing unit (MPU), a controller, an application processor (AP), a communication processor (CP), an ARM processor, or an artificial intelligence (AI) processor, or may be defined by the corresponding term. In addition, the processor 120 may be implemented as a System on Chip (SoC) or a large scale integration (LSI) in which a processing algorithm is embedded, and may be implemented in the form of a field programmable gate array (FPGA). The processor 120 may perform various functions by executing computer executable instructions stored in the memory.

As described in FIG. 3, if the display device 100 is not able to differentiate the main connection path and the sub connection path between the plurality of display devices 100-1, . . . , **100-*n* constituting the modular display device 1000, there may be a problem of the display device 100 not being able to classify the signal output by the main control box 200-1 and the signal output by the sub control box 200-2** from among signals received through the first communication interface and signals received through the second communication interface.

The processor according to an embodiment of the disclosure may identify, based on a specific signal (e.g., a first signal) transmitted by the main control box 200-1 being received through the first communication interface 110-1 from among the plurality of communication interfaces 110, the first communication interface 110-1 as the communication interface to which the signal output by the main control box 200-1 is received along the main connection path.

Here, the specific signal transmitted by the main control box 200-1 may include identification information for identifying the main connection path. For example, the specific signal transmitted by the main control box 200-1 may include identification information indicating that the corresponding specific signal has been transmitted from the main control box 200-1, and may be different from the signal output from the sub control box 200-2.

The processor 120 according to an embodiment of the disclosure may control remaining communication interfaces for the remaining communication interfaces from among the plurality of interfaces 110 to output the specific signal received through the first communication interface 110-1. Detailed descriptions thereof will be provided with reference to FIG. 5.

Figure 5:
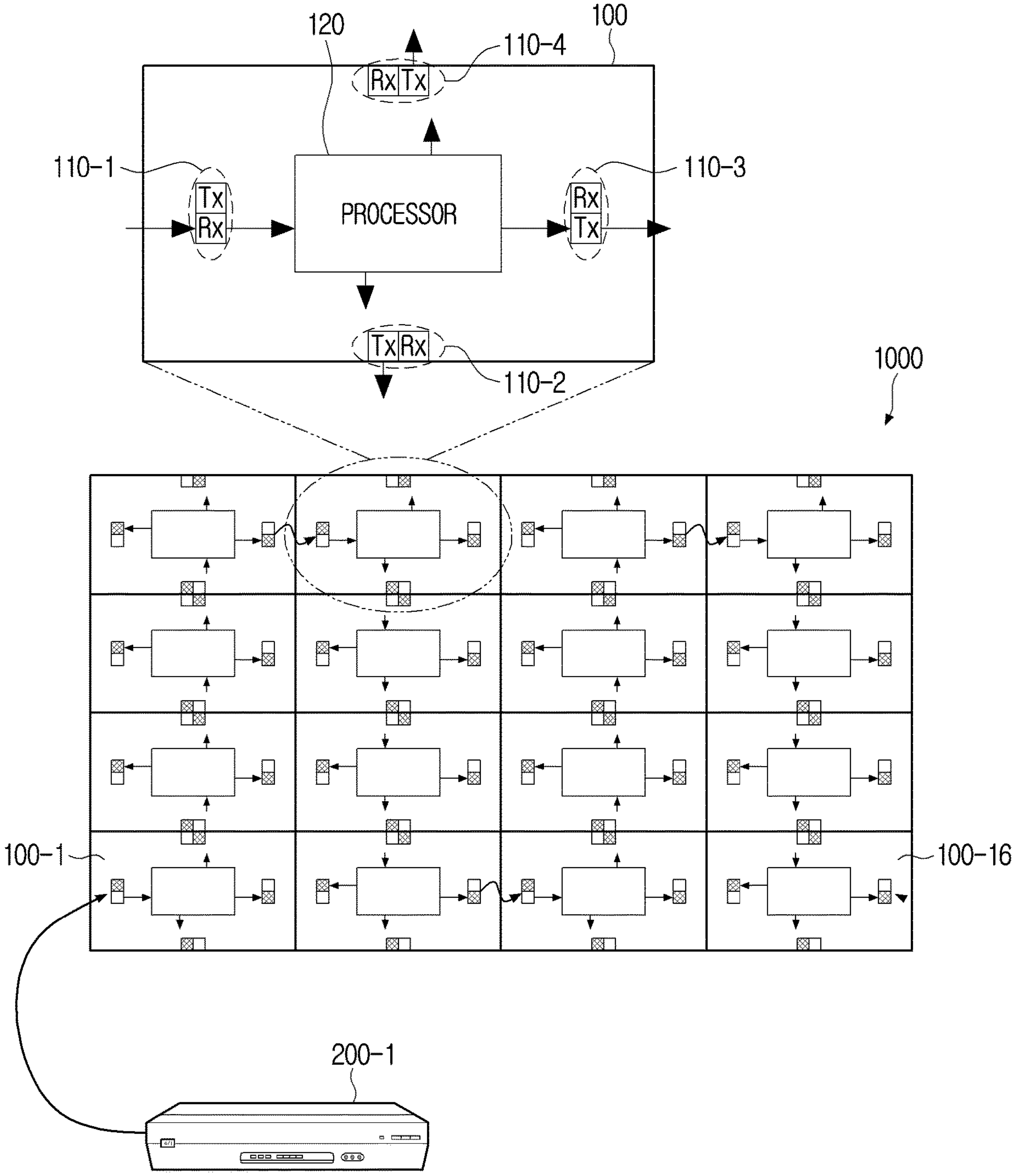
FIG. 5 is a diagram illustrating a transmission path of a specific signal according to an embodiment of the disclosure.

FIG. 5 is a diagram illustrating a transmission path of a specific signal according to an embodiment of the disclosure.

Referring to FIG. 5, the respective communication interfaces 110 provided in the display device 100 may be positioned at each of the four directions based on the front surface of the display device 100.

In an example, the first communication interface 110-1 may be positioned at a first direction from among the four directions. In another example, a second communication interface 110-2 may be positioned at a second direction from among three directions excluding the first direction from the four directions. The four directions may include the upper side, the lower side, the left side, and the right side based on the front surface of the display device.

Referring to FIG. 5, the processor 120 may identify, based on the specific signal transmitted by the main control box 200-1 being received through the first communication interface 110-1, the first communication interface 110-1 as the communication interface to which the signal is received along the main connection path.

In addition, the processor 120 may control the remaining communication interfaces for the remaining communication interfaces (e.g., second to fourth communication interfaces 110-2, 110-3, and 110-4) to output the specific signal received through the first communication interface 110-1.

Any one signal from among the specific signals output by the respective remaining communication interfaces may be received by an adjacent another display device 100'. Detailed descriptions thereof will be provided with reference to FIG. 6.

In FIG. 5, the respective communication interfaces 110 being constituted with receiving modules Rx and transmitting modules Tx have been shown for convenience of description, but this is one example and is not limited thereto.

Figure 6:
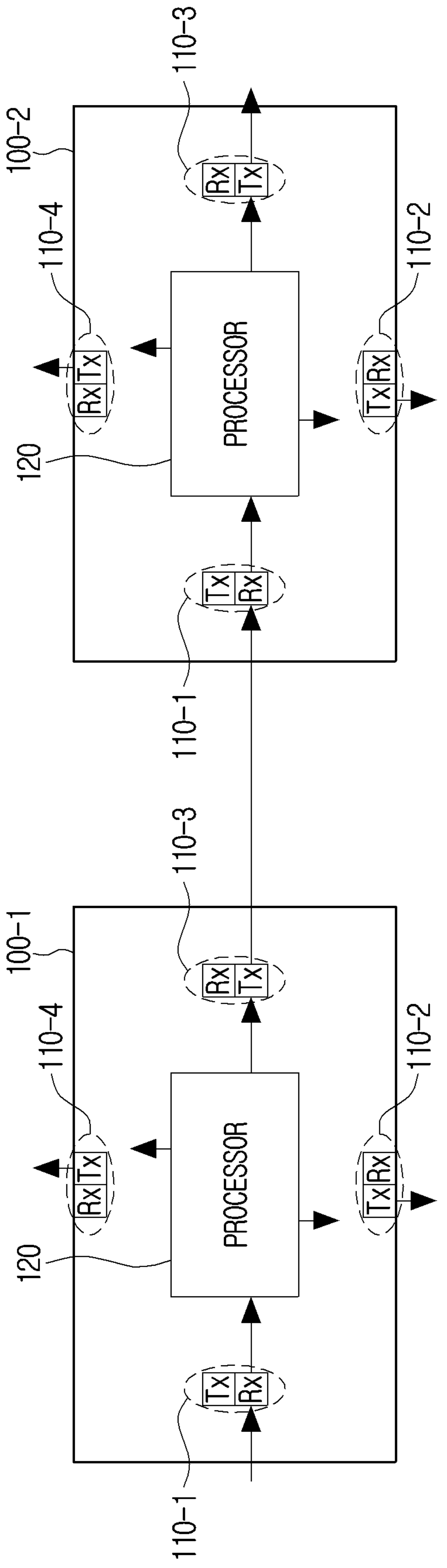
FIG. 6 is a diagram illustrating a method for transmitting a specific signal to another display device by a display device according to an embodiment of the disclosure.

FIG. 6 is a diagram illustrating a method for transmitting a specific signal to another display device by a display device according to an embodiment of the disclosure.

Referring to FIG. 6, the processor 120 provided in the first display device 100-1 may identify, based on the specific signal transmitted by the main control box 200-1 being received through the first communication interface 110-1, the first communication interface 110-1 as the communication interface to which the signal is received along the main connection path. Then, the processor 120 provided in the first display device 100-1 may control for the second to fourth communication interfaces 110-2, 110-3, and 110-4 to output the specific signal received through the first communication interface 110-1.

Then, the second display device 100-2 positioned adjacently to the first display device 100-1 may receive the specific signal output by the third communication interface 110-3 of the first display device 100-1 through the first communication interface 110-1.

The processor 120 provided in the second display device 100-2 may identify, based on the specific signal transmitted by the main control box 200-1 being received through the first communication interface 110-1, the first communication interface 110-1 as the communication interface to which the signal is received along the main connection path.

Then, the processor 120 provided in the second display device 100-2 may control for the second to fourth communication interfaces 110-2, 110-3, and 110-4 provided in the second display device 100-2 to output the specific signal received through the first communication interface 110-1.

The specific signal output by the second communication interface 110-2 and a fourth communication interface 110-4 of the first display device 100-1 may not be received by the adjacent another display device 100'. In an example, the specific signal output by the second communication interface 110-2 may not be transmitted anywhere because the another display device 100' connected to the first display device 100-1 through the second communication interface 110-2 is not present.

The processor 120 according to an embodiment of the disclosure may identify, based on a feedback signal indicating the receipt of the specific signal being received from the another display device 100' through the second communication interface 110-2 from among the remaining communication interfaces after the respective remaining communication interfaces (e.g., second to fourth communication interfaces 110-2, 110-3, and 110-4) output the specific signal, the second communication interface 110-2 as the communication interface for transmitting the signal along the main connection path.

Figure 7:
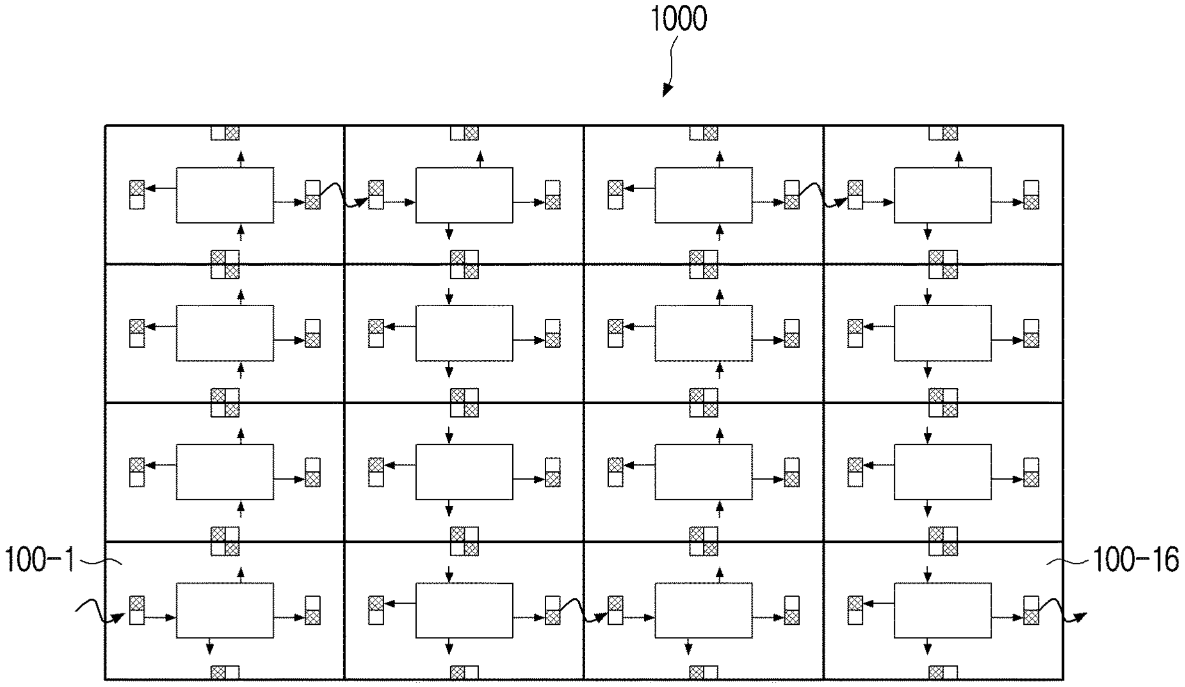
FIG. 7 is a diagram illustrating a method for identifying a connection path between display devices according to an embodiment of the disclosure.

FIG. 7 is a diagram illustrating a method for identifying a connection path between display devices according to an embodiment of the disclosure.

Based on each of the first to sixteenth display devices 100-1, . . . , 100-16 transmitting the specific signal through the remaining interfaces after receiving the specific signal transmitted by the main control box 200-1 through any one interface from among the plurality of interfaces 110 according to the method shown in FIG. 6, each of the first to sixteenth display devices 100-1, . . . , 100-16 may identify the communication interface to which the signal is received along the main connection path from among the plurality of communication interfaces 110.

In FIG. 1 to FIG. 7, a method of identifying the communication interface to which the signal transmitted by the main control box 200-1 is received along the main connection path has been described, but according to various embodiments of the disclosure, the communication interface which receives the signal transmitted by the sub control box 200-2 along the sub connection path may also be identified.

In an example, the processor 120 may identify, based on the specific signal (e.g., a second signal) transmitted by the sub control box 200-2 being received through the second communication interface 110-2 from among the plurality of communication interfaces 110, the second communication interface 110-2 as the communication interface to which the signal is received along the sub connection path. Here, the sub connection path may be a connection path for sequentially transmitting the signal transmitted by the sub control box 200-2 to the respective display devices 100-1, . . . , **100-*n*, and may have a reverse order relationship with the main connection path. For example, the solid line arrow as shown in FIG. 1** may indicate the main connection path, and the dotted line arrow may indicate the sub connection path.

The processor 120 according to an embodiment of the disclosure may identify, based on the plurality of signals being received through the plurality of communication interfaces 110, the signal received through the first communication interface 110-1 from among the plurality of signals. Then, the processor 120 may control the display device 100 based on the signal received through the first communication interface 110-1, and ignore the remaining signals.

In another example, the processor 120 may control, based on there being no signal received through the first communication interface 110-1 from among the plurality of signals, the display device 100 based on the signal received through the second communication interface 110-2 from among the plurality of signals. A summary of the above has been provided in a table as below.

TABLE 1

| input | | |
|---|---|---|
| first communication interface | second communication interface | operation |
| ○ | X | first communication interface |
| X | ○ | second communication interface |
| ○ | ○ | first communication interface |

Referring to Table 1, the processor 120 may control the display device 100 based on the signal received through the first communication interface 110-1, which receives the specific signal transmitted by the main control box 200-1 along the main connection path, rather than the set priority order.

In another example, the processor 120 may control the display device 100 based on the signal received through the second communication interface 110-2 only when there is no signal received through the first communication interface 110-1.

Here, the first communication interface 110-1 may be an interface that receives a first signal from a first another display device 100' adjacent to the display device 100 according to the control of the processor 120 or transmits a second signal to the first another display device 100'.

The second communication interface 110-2 may be an interface that receives the second signal from a second another display device 100" adjacent to the display device 100 or transmits the first signal to a second another display device 100' according to the control of the processor 120.

Here, the first signal may be signals (e.g., image signal, OSD menu display signal, other control signals, etc.) output by the main control box 200-1 and sequentially transmitted to the plurality of display devices 100-1, . . . , **100-*n***, respectively, along the main connection path.

The second signal may be signals (e.g., image signal, etc.) output by the sub control box 200-2 and sequentially transmitted to the plurality of display devices 100-1, . . . , **100-*n*, respectively, along the sub connection path. Here, a transmission order of the second signal may have a reverse order relationship with a transmission order of the first signal. For example, the first signal may be transmitted in an order from the first display device 100-1 to the nth display device 100-*n*, and the second signal may be transmitted in an order from the nth display device 100-*n* to the first display device 100-1**.

Referring back to FIG. 1, the display device 100 according to an embodiment of the disclosure may further include a memory.

The memory according to an embodiment of the disclosure may store data necessary in various embodiments of the disclosure. The memory may be implemented in a form of a memory embedded to the display device 100 according to data storage use, or implemented in a form of a memory attachable to or detachable from the display device 100.

For example, data for driving of the display device 100 may be stored in the memory embedded to the display device 100, and data for an expansion function of the display device 100 may be stored in the memory attachable to or detachable from the display device 100. Meanwhile, the memory embedded to the display device 100 may be implemented as at least one from among a volatile memory (e.g., a dynamic RAM (DRAM), a static RAM (SRAM), or a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard disk drive (HDD) or a solid state drive (SSD)). In addition, the memory attachable to or detachable from the display device 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The memory according to an example may store at least one instruction or a computer program including the instructions for controlling the display device 100.

Specifically, the memory may store a plurality of order information for the respective communication interfaces 110.

The processor 120 according to an embodiment of the disclosure may control, based on the plurality of signals being received through the plurality of communication interfaces 110, the display device 100 based on a signal received through a pre-set communication interface (e.g., a communication interface having a highest priority order) from among the plurality of signals according to priority order information stored in the memory. In addition, the processor 120 may ignore the remaining signals.

The processor 120 may update, based on the specific signal transmitted by the main control box 200-1 being received through the first communication interface 110-1, the priority order corresponding to the first communication interface 110-1 in the priority order information.

For example, the processor 120 may identify, based on the specific signal transmitted by the main control box 200-1 being received through the first communication interface 110-1, the first communication interface 110-1 as the communication interface to which the signal is received along the main connection path, and update the priority order information for the first communication interface 110-1 to have the highest priority order from among the plurality of interfaces 110.

The display device 100 according to an embodiment of the disclosure may include a display, and the display may be implemented as a display including self-emissive devices or as a display including non-emissive devices and a backlight.

The display may be implemented as a display of various types such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diodes (QLED), or the like. In a display 130, a driving circuit, which may be implemented in the form of an a-si TFT, a low temperature poly silicon (LTPS) TFT, an organic TFT (OTFT), or the like, a backlight unit, and the like may be included. Meanwhile, the display 130 may be implemented as a touch screen coupled with a touch sensor, a flexible display, a rollable display, a three-dimensional display (3D display), a display physically coupled with a plurality of display modules, or the like.

Figure 8:
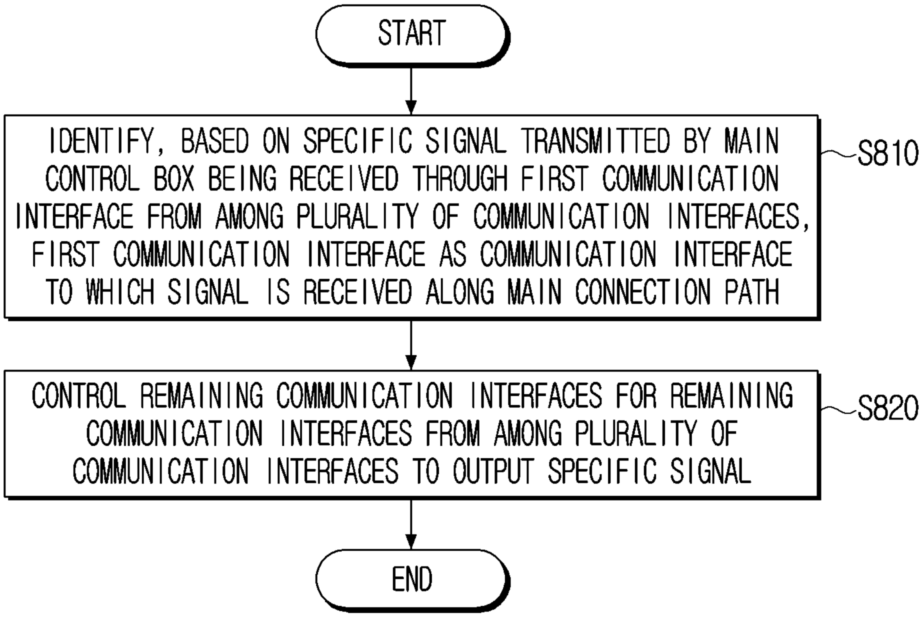
FIG. 8 is a diagram illustrating a control method of a display device according to an embodiment of the disclosure.

FIG. 8 is a flowchart illustrating a control method of a display device according to an embodiment of the disclosure.

A control method of the display devices included in the modular display device according to an embodiment may first include identifying, based on the specific signal transmitted by the main control box being received through the first communication interface from among the plurality of communication interfaces provided in the display device, the first communication interface as the communication interface to which the signal is received along the main connection path (S810).

Then, the remaining communication interfaces may be controlled for the remaining communication interfaces to output the specific signal from among the plurality of communication interfaces (S820).

Here, the main connection path may be a connection path for sequentially transmitting the signal transmitted by the main control box to the respective display devices.

The control method according to an embodiment of the disclosure may further include identifying, based on the specific signal transmitted by the sub control box being received through the second communication interface from among the plurality of communication interfaces, the second communication interface as the communication interface to which the signal is received along the sub connection path, and here, the sub connection path may be a connection path for sequentially transmitting the signal transmitted by the sub control box to the respective display devices, and may be in a reverse order relationship with the main connection path.

The control method according to an embodiment of the disclosure may further include identifying, based on the feedback signal indicating the receipt of the specific signal being received through the second communication interface from among the remaining communication interfaces after the respective remaining communication interfaces output the specific signal, the second communication interface as the communication interface for transmitting the signal along the main connection path.

The control method according to an embodiment of the disclosure may further include identifying, based on the plurality of signals being received through the plurality of communication interfaces, the signal received through the first communication interface from among the plurality of signals, and controlling the display device based on the signal received through the first communication interface and ignoring the remaining signals.

Here, if there is no signal received through the first communication interface from among the plurality of signals, controlling the display device based on the signal received through the second communication interface from among the plurality of signals may be further included.

The respective display devices according to an embodiment of the disclosure may be disposed in the matrix form, the respective communication interfaces may be positioned at each of the four directions based on the front surface of the display device, the first communication interface may be positioned at the first direction from among the four directions, the second communication interface may be positioned at the second direction from among the three directions excluding the first direction from among the four directions, and the four directions may include the upper side, the lower side, the left side, and the right side based on the front surface of the display device, and the method may include receiving the first signal from a first another display device adjacent to the display device through the first communication interface or transmitting the second signal to the first another display device, and receiving the second signal from a second another display device adjacent to the display device through the second communication interface or transmitting the first signal to the second another display device.

Here, the first signal may be a signal output by the main control box and sequentially transmitted to the respective display devices along the main connection path, and the second signal may be a signal output by the sub control box and sequentially transmitted to the respective display devices along the sub connection path.

The specific signal transmitted by the main control box according to an embodiment may include identification information for identifying the main connection path.

In addition, the display device may include the priority order information for the respective communication interfaces, and the control method according to an embodiment may include controlling, based on the plurality of signals being received through the plurality of communication interfaces, the display device based on the signal received through the pre-set communication interface from among the plurality of signals according to the priority order information, and updating, based on the specific signal transmitted by the main control box being received through the first communication interface, the priority order corresponding to the first communication interface in the priority order information.

However the various embodiments of the disclosure may be applied to not only an electronic device but also electronic devices of all types that include a display.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

Computer instructions for performing processing operations of the electronic device according to the various embodiments of the disclosure described above may be stored in a non-transitory computer-readable medium. The computer instructions stored in this non-transitory computer-readable medium may cause a specific device to perform a processing operation of the electronic device 100 according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a read only memory (ROM), and the like.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A display device of a modular display device comprising a plurality of display devices, the display device comprising:

a plurality of communication interfaces respectively provided at four directions based on a front surface of the display device and configured to communicate with a plurality of other display devices arranged at different sides of the display device; and at least one processor configured to:

identify, based on a first signal transmitted by a main control box being received through a first communication interface from among the plurality of communication interfaces, the first communication interface as having received the first signal along a main connection path, based on receiving the first signal through the first communication interface, control a plurality of remaining communication interfaces among the plurality of communication interfaces, other than the first communication interface, to output the first signal to the plurality of other display devices, respectively, based on controlling the plurality of remaining communication interfaces to output the first signal to the plurality of other display devices, identify, among the plurality of remaining communication interfaces, a second communication interface as having transmitted the first signal along the main connection path based on a feedback signal indicating a receipt of the first signal being received through the second communication interface, and identify, based on a second signal transmitted by a sub control box being received through the second communication interface from among the plurality of communication interfaces, the second communication interface as having received the second signal along a sub connection path, wherein the main connection path is for sequentially transmitting the first signal transmitted by the main control box to the plurality of display devices, respectively, and wherein the sub connection path is for sequentially transmitting the second signal transmitted by the sub control box to the respective display devices in a reverse order than the main connection path.

2. The display device of claim 1, wherein the at least one processor is further configured to:

identify, based on a plurality of signals being received through the plurality of communication interfaces, the first signal received through the first communication interface among the plurality of signals, and control the display device based on the first signal received through the first communication interface and ignore remaining signals.

3. The display device of claim 2, wherein the at least one processor is further configured to:

control, based on no signal being received through the first communication interface among the plurality of signals, the display device based on the second signal received through the second communication interface.

4. The display device of claim 1, wherein the plurality of display devices are provided in a matrix form, wherein the first communication interface is provided at a first direction among the four directions, and is configured to receive the first signal from a first display device adjacent to the display device and transmit the second signal to the first display device, wherein the second communication interface is provided at a second direction among the four directions, and is configured to receive the second signal from a second display device adjacent to the display device and transmit the first signal to the second display device, and the four directions comprise an upper side, a lower side, a left side, and a right side based on the front surface of the display device.

5. The display device of claim 4, wherein the first signal is output by the main control box and sequentially transmitted to the display devices along the main connection path, and wherein the second signal is output by the sub control box and sequentially transmitted to the display devices along the sub connection path.

6. The display device of claim 1, wherein the first signal transmitted by the main control box comprises identification information for identifying the main connection path.

7. The display device of claim 1, further comprising:

a memory storing priority order information for the respective communication interfaces, wherein the at least one processor is further configured to:

control, based on a plurality of signals being received through the plurality of communication interfaces, the display device based on a signal received through a predetermined communication interface among the plurality of signals according to the priority order information, and update, based on the first signal transmitted by the main control box being received through the first communication interface, a priority order corresponding to the first communication interface in the priority order information.

8. The display device of claim 1, wherein the first signal comprises an image signal transmitted from the main control box, and the second signal comprises an image signal transmitted from the sub control box.

9. The display device of claim 1, further comprising:

a memory storing priority order information for the respective communication interfaces, wherein the at least one processor is further configured to:

update, based on identifying the first communication interface as having received the first signal along the main connection path, the priority order information for the first communication interface to have a higher priority than the plurality of remaining communication interfaces including the second communication interface, in a state in which a plurality of signals are being received through the plurality of communication interfaces, control, based on the priority order information, the display device according to the first signal received through the first communication interface and ignore remaining signals.

10. A control method of a display device, of a modular display device comprising a plurality of display devices including the display device and a plurality of other display devices arranged at different sides of the display device, the method comprising:

identifying, based on a first signal transmitted by a main control box being received through a first communication interface among a plurality of communication interfaces respectively provided at four directions based on a front surface of the display device, the first communication interface as having received the first signal along a main connection path;

based on receiving the first signal through the first communication interface, controlling a plurality of remaining communication interfaces among the plurality of communication interfaces, other the first communication interface, to output the first signal to the plurality of other display devices, respectively;

based on controlling the plurality of remaining communication interfaces to output the first signal to the plurality of other display devices, identify, among the plurality of remaining communication interfaces, a second communication interface as having transmitted the first signal along the main connection path based on a feedback signal indicating a receipt of the first signal being received through the second communication interface; and identifying, based on a second signal transmitted by a sub control box being received through the second communication interface among the plurality of communication interfaces, the second communication interface as having received the second signal along a sub connection path, wherein the main connection path is for sequentially transmitting the first signal transmitted by the main control box to the display devices, and wherein the sub connection path is for sequentially transmitting the second signal transmitted by the sub control box to the display devices in a reverse order than the main connection path.

11. The method of claim 10, further comprising:

identifying, based on a plurality of signals being received through the plurality of communication interfaces, the first signal received through the first communication interface; and controlling the display device based on the first signal received through the first communication interface and ignoring remaining signals.

12. The method of claim 11, further comprising:

controlling, based on no signal being received through the first communication interface among the plurality of signals, the display device based on the second signal received through the second communication interface.

13. The method of claim 10, wherein the plurality of display devices are provided in a matrix form, wherein the first communication interface is provided at a first direction among the four directions, wherein the second communication interface is provided at a second direction among the four directions, wherein the four directions comprise an upper side, a lower side, a left side, and a right side based on the front surface of the display device, and wherein the method further comprises:

receiving the first signal from a first display device adjacent to the display device through the first communication interface or transmitting the second signal to the first display device; and receiving the second signal from a second display device adjacent to the display device through the second communication interface or transmitting the first signal to the second display device.

14. The method of claim 13, wherein the first signal is output by the main control box and sequentially transmitted to the display devices along the main connection path, and wherein the second signal is output by the sub control box and sequentially transmitted to the display devices along the sub connection path.

15. The method of claim 10, wherein the first signal transmitted by the main control box comprises identification information for identifying the main connection path.

16. The method of claim 10, wherein the display device comprises priority order information for the respective communication interfaces, and wherein the method further comprises:

controlling, based on a plurality of signals being received through the plurality of communication interfaces, the display device based on a signal received through a predetermined communication interface among the plurality of signals according to the priority order information; and updating, based on the first signal transmitted by the main control box being received through the first communication interface, a priority order corresponding to the first communication interface in the priority order information.

17. A non-transitory computer-readable recording medium including a program which, when executed by a display device of a modular display device comprising the display device and a plurality of other display devices arranged at different sides of the display device, to perform a control method, the control method comprising:

identifying, based on a first signal transmitted by a main control box being received through a first communication interface among a plurality of communication interfaces respectively provided at four directions based on a front surface of the display device, the first communication interface as having received the first signal along a main connection path;

based on receiving the first signal through the first communication interface, controlling a plurality of remaining communication interfaces among the plurality of communication interfaces, other the first communication interface, to output the first signal to the plurality of other display devices, respectively;

based on controlling the plurality of remaining communication interfaces to output the first signal to the plurality of other display devices, identify, among the plurality of remaining communication interfaces, a second communication interface as having transmitted the first signal along the main connection path based on a feedback signal indicating a receipt of the first signal being received through the second communication interface; and identifying, based on a second signal transmitted by a sub control box being received through the second communication interface among the plurality of communication interfaces, the second communication interface as having received the second signal along a sub connection path, wherein the main connection path is for sequentially transmitting the first signal transmitted by the main control box to the display devices, and wherein the sub connection path is for sequentially transmitting the second signal transmitted by the sub control box to the display devices in a reverse order than the main connection path.

18. The method of claim 17, further comprising:

identifying, based on a plurality of signals being received through the plurality of communication interfaces, the first signal received through the first communication interface; and controlling the display device based on the first signal received through the first communication interface and ignoring remaining signals.

19. The method of claim 18, further comprising:

controlling, based on no signal being received through the first communication interface among the plurality of signals, the display device based on the second signal received through the second communication interface.

* * * * *